United States Patent [19]
Kusano et al.

[11] Patent Number: 5,686,807
[45] Date of Patent: Nov. 11, 1997

[54] TORQUE CONTROL SYSTEM FOR AC MOTOR

[75] Inventors: Katsuyuki Kusano, Iruma-gun; Yasushi Kanai, Sayama; Yuji Saito, Asaka; Tomoyuki Itoh, Adachi-ku, all of Japan

[73] Assignee: Honda Giken Kogyo Kabushiki Kaisha, Tokyo, Japan

[21] Appl. No.: 738,344

[22] Filed: Oct. 25, 1996

Related U.S. Application Data

[63] Continuation of Ser. No. 94,412, Jul. 19, 1993, abandoned.

[30] Foreign Application Priority Data

Jul. 17, 1992 [JP] Japan ................... 4-213731

[51] Int. Cl.$^6$ ........................................ H02P 5/28
[52] U.S. Cl. ................... 318/808; 318/801; 318/438; 318/432
[58] Field of Search ................... 318/798, 800–803, 318/806–811, 432, 438; 363/37, 50, 51, 84, 85, 88, 123

[56] References Cited

U.S. PATENT DOCUMENTS

| | | | |
|---|---|---|---|
| 4,366,427 | 12/1982 | Walker et al. | 318/798 |
| 4,409,535 | 10/1983 | Hickman | 318/811 |
| 4,494,180 | 1/1985 | Streater et al. | 318/801 |
| 4,681,191 | 7/1987 | Ikejima | 187/119 |
| 4,719,398 | 1/1988 | Paice | 318/778 |
| 4,788,485 | 11/1988 | Kawagishi et al. | 318/811 |
| 4,800,327 | 1/1989 | Fujioka et al. | 318/798 |
| 4,876,637 | 10/1989 | Mose et al. | 318/811 |
| 4,885,518 | 12/1989 | Schauder | 318/806 |
| 5,184,057 | 2/1993 | Sakai et al. | 318/801 |
| 5,206,575 | 4/1993 | Nakamura et al. | 318/807 |
| 5,350,989 | 9/1994 | Wedeen | 318/632 |
| 5,428,274 | 6/1995 | Furutani et al. | 318/139 |

FOREIGN PATENT DOCUMENTS 63-257497  10/1988  Japan.

*Primary Examiner*—John W. Cabeca
*Attorney, Agent, or Firm*—Lyon & Lyon LLP

[57] ABSTRACT

A motor torque control system has an inverter for converting a DC voltage from a battery into an AC voltage to energize an AC motor based on a command amplitude value. An input electric power calculating unit calculates an input electric power supplied from the battery based on a current and a voltage from the battery. A target electric power calculating unit calculates a target electric power to be supplied to the AC motor based on the rotational speed of the AC motor and a command torque value indicative of a torque to be produced by the AC motor. A PI control unit produces a control signal from the difference between the input electric power and the target electric power, and a PWM control unit controls the command amplitude value based on the control signal.

15 Claims, 1 Drawing Sheet

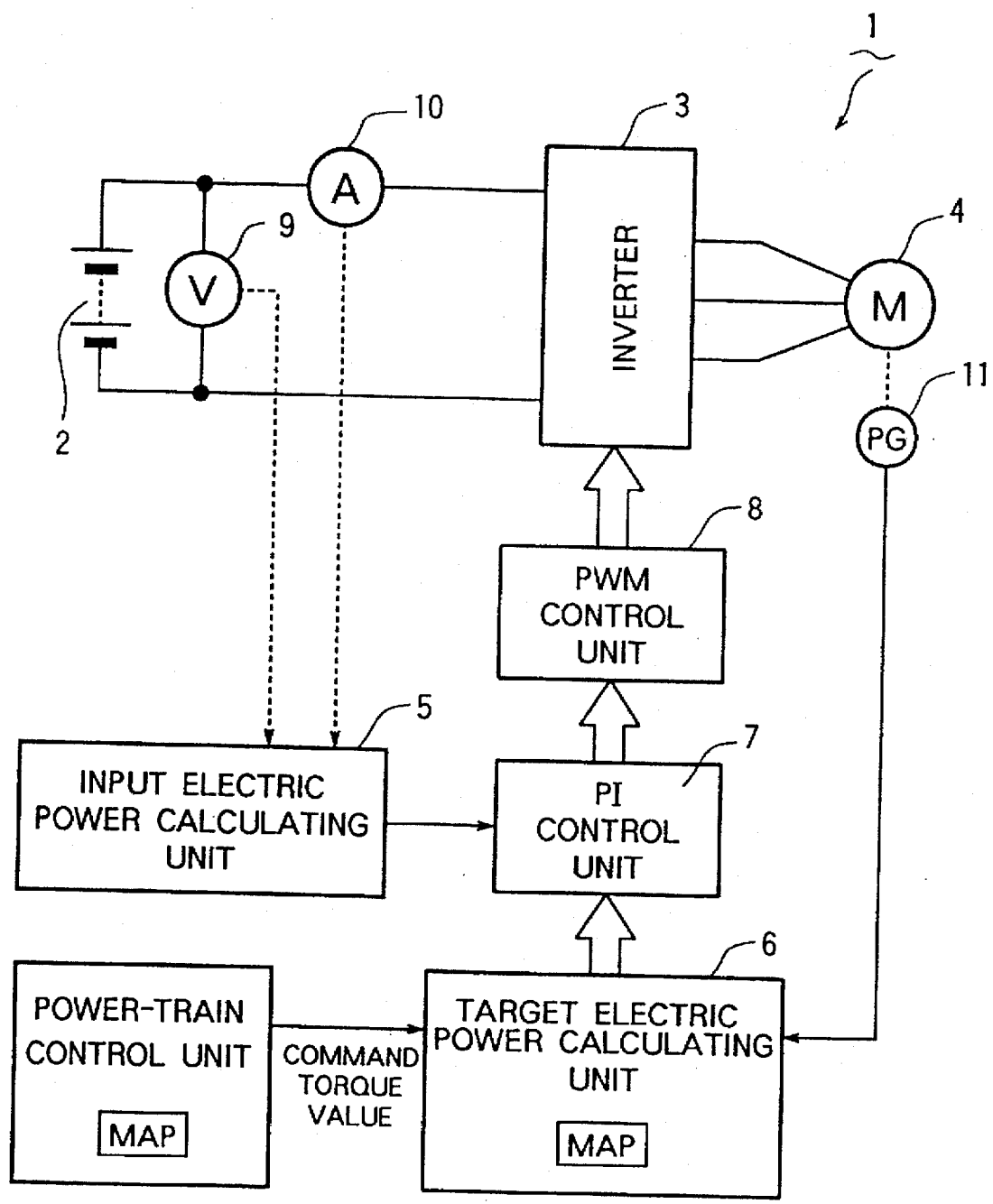

TORQUE CONTROL SYSTEM FOR AC MOTOR

This application is a continuation application of application Ser. No. 08/094,412 filed on Jul. 19, 1993 now abandoned.

BACKGROUND OF THE INVENTION

1. Field of the Invention

The present invention relates to a torque control system for controlling the torque of an AC motor based on the rotational speed of the AC motor.

2. Description of the Related Art

There has heretofore been known a motor torque control system which detects phase currents of a three-phase AC motor and feeds back the detected phase currents to control an inverter, which is composed of switching devices, to supply drive currents to the AC motor so that the AC motor will generate a desired target torque.

The conventional motor torque control system requires current detectors for detecting at least two of the three phase currents of the three-phase AC motor and a converter for converting the detected phase currents into their effective values. Since these current detectors and converter are relatively expensive, the motor torque control system is also relatively expensive.

Since large output currents are supplied from the inverter to the AC motor, the current detectors that are used are large in size and capacity and should be highly responsive with respect to the frequency of the alternating currents supplied to the AC motor.

The switching devices of the inverter effect a switching action on the large electric power that is handled by the inverter. Therefore, output lines connected from the inverter to the current detectors are subject to radiating noise from the switching devices. Since the currents flowing through the output lines contain high-frequency components, the output lines are responsible for noise generation.

As a result, the conventional motor torque control system is not suitable for use as a system for controlling a motor which is used to propel an electric motor vehicle, for example.

SUMMARY OF THE INVENTION

It is therefore an object of the present invention to provide a motor torque control system which is of a relatively inexpensive structure with no current detectors connected to output terminals of an inverter which is connected to an AC motor.

Another object of the present invention is to provide a motor torque control system for controlling an electric power supplied to an AC motor based on the rotational speed of the AC motor to enable the AC motor to produce a torque that is required.

According to the present invention, there is provided a torque control system for controlling the torque of an AC motor, comprising driving means for converting a DC voltage from a DC power supply to generate a drive current to energize the AC motor based on a command amplitude value, first calculating means for calculating an input electric power supplied from the DC power supply based on a current and a voltage from the DC power supply, detecting means for detecting a rotational speed of the AC motor, second calculating means for calculating a target electric power based on the rotational speed detected by the detecting means and a command torque value indicative of a torque to be produced by the AC motor, first control means for producing a control signal from the difference between the input electric power and the target electric power, and second control means for controlling the command amplitude value based on the control signal.

The second calculating means may comprise a map composed of the values of electric powers as a functions of the values of rotational speeds of the AC motor and command torque values, and means for determining a target electric power from the map based on the detected rotational speed and the command torque value.

The first control means may comprise means for effecting a proportional plus integral control process on the input electric power and the target electric power to produce the control signal.

The second control means may comprise means for pulse-width-modulating the control signal into the command amplitude value to control the driving means.

The above and further objects, details and advantages of the present invention will become apparent from the following detailed description of a preferred embodiment thereof, when read in conjunction with the accompanying drawings.

BRIEF DESCRIPTION OF THE DRAWINGS

The sole FIGURE is a block diagram of a torque control system for an AC motor according to the present invention.

DETAILED DESCRIPTION OF THE PREFERRED EMBODIMENT

As shown in the FIGURE, a torque control system, generally designated by the reference numeral 1, according to the present invention comprises a battery 2 for producing a DC voltage of 200 volts, for example, an inverter 3 for producing a drive current to energize an AC motor 4, an input electric power calculating unit 5 for calculating the input electric power supplied from the battery 2 to the inverter 3, a target electric power calculating unit 6 for calculating a target electric power to be supplied to the AC motor 4, a proportional plus integral (PI) control unit 7 for producing a control signal according to proportional and integral control, and a pulse-width-modulation (PWM) control unit 8 for pulse-width-modulating the control signal and applying the pulse-width-modulated control signal to the inverter 3. The target electric power calculating unit 6 is supplied, from a power-train control unit 12, with a command torque value signal indicative of the torque to be produced by the AC motor 4.

The AC motor 4 is connected to the battery 2 through the inverter 3. The inverter 3 converts the DC voltage produced by the battery 2 into a three-phase AC voltage, which is then applied to the AC motor 4 to drive the AC motor 4.

The voltage and current supplied from the battery 2 to the inverter 3 are detected respectively by a voltmeter 9 connected parallel to the battery 2 and an ammeter 10 connected in series with the battery 2. The values of the detected voltage and current are supplied to the input electric power calculating unit 5, which then calculates the input electric power supplied by the battery 2 by multiplying the values of the detected voltage and current. The value of the calculating input electric power is then supplied to the PI control unit 7.

The AC motor 4 is associated with a rotational speed sensor 11 for detecting the rotational speed of the AC motor 4. A signal indicative of the detected rotational speed of the AC motor 4 is supplied from the rotational speed sensor 11 to the target electric power calculating unit 6.

A command torque value is determined by a power-train control unit 12 based on the accelerator opening and the motor rotational speed. More specifically, the power-train control unit 12, which is connected to the target electric power calculating unit 6, stores, as map data, command torque values in relation to accelerator openings and motor rotational speeds. When an accelerator opening and a motor rotational speed are detected, map data representing a corresponding command torque value is read and outputted from the power-train control unit 12 to the target electric power calculating unit 6.

The target electric power calculating unit 6 determines a target electric power to be applied to the AC motor 4 based on the detected rotational speed of the AC motor 4 and the command torque value supplied from the power-train control unit 12. The target electric power calculating unit 6 determines the target electric power using a map which is composed of target electric powers that are given as a function of input parameters representing motor rotational speeds and command torque values, taking into account other factors including efficiency, a torque constant, etc. The map is stored in a memory such as a ROM in the target electric power calculating unit 6. Therefore, when the detected motor rotational speed and the supplied command torque value are given as parameters to the target electric power calculating unit 6, a target electric power corresponding to those given parameters is determined from the map according to a search process and a linear interpolation process by the target electric power calculating unit 6.

The value of the target electric power thus determined by the target electric power calculating unit 6 is then supplied to the PI control unit 7. The PI control unit 7 effects a proportional plus integral control process on the input electric power from the input electric power calculating unit 5 and the target electric power from the target electric power calculating unit 6, and produces a control signal to eliminate any difference between the target electric power and the input electric power, i.e., to equalize the input electric power with the target electric power. The produced control signal is applied to the PWM control unit 8.

The PWM control unit 8 pulse-width-modulates the supplied control signal into a PWM signal representing a command amplitude value for the current to be supplied to the AC motor 4. The PWM signal is then applied to control the inverter 3. Based on the applied PWM signal, the inverter 3 converts the DC voltage from the battery 2 into a three-phase AC voltage that is applied to energize the AC motor 4 to produce a torque which is equal to the command torque value supplied to the target electric power calculating unit 6. Therefore, the AC motor 4 is controlled by a feedback loop to produce a desired motor torque.

As described above, the motor torque control system according to the present invention detects the rotational speed of the AC motor 4, calculates a target electric power to be supplied to the AC motor 4 based on the detected rotational speed and a supplied command torque value, and controls the AC motor 4 with a command amplitude value for the current to be supplied to the AC motor 4 based on the calculated target electric power. Since the torque produced by the AC motor 4 is controlled based on the rotational speed thereof, it is not necessary to employ expensive large-size current detectors such as torque sensors for detecting the torque of the AC motor 4. Thus, the control of the AC motor by this invention is accomplished without detecting the actual values of either output torque of the AC motor or input current to the AC motor. Therefore, the motor torque control system according to the present invention is relatively inexpensive and small, and resistant to noise.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A torque control system for controlling the torque of an AC motor, comprising:

driving means for converting a DC voltage from a DC power supply to generate a drive current to energize the AC motor based on a command amplitude value;

first calculating means for calculating an input electric power supplied from the DC power supply based on a current and a voltage from the DC power supply;

detecting means for detecting a rotational speed of the AC motor;

second calculating means for calculating a target electric power based solely on both the rotational speed detected by said detecting means and a command torque value indicative of a desired torque to be produced by the AC motor, without detecting actual values of output torque of and input current to the AC motor;

first control means for producing a control signal from the difference between the input electric power and the target electric power; and second control means for controlling said command amplitude value based on said control signal.

2. A torque control system according to claim 1, wherein said second calculating means comprises a map composed of the values of electric power as a function of the values of rotational speeds of the AC motor and command torque values, and means for determining a target electric power from said map based on the detected rotational speed and the command torque value.

3. A torque control system according to claim 1, wherein said first control means comprises means for effecting a proportional plus integral control process on the input electric power and the target electric power to produce said control signal.

4. A torque control system according to claim 1, wherein said second control means comprises means for pulse width-modulating said control signal into said command amplitude value to control said driving means.

5. A torque control system for controlling the torque of an AC motor operated by AC power through an inverter from a DC power supply, comprising:

means for detecting values of rotational speed of the AC motor and current and voltage of the DC power supply during operation of the AC motor, without detecting actual values of output torque of and input current to the AC motor, and means for producing a control signal based on said detected values and supplying said control signal to the inverter for controlling an amplitude value of the AC power supplied by the inverter to the AC motor for controlling the torque.

6. A torque control system according to claim 5, wherein said means for producing a control signal includes a calculating means for calculating an input electric power supplied from the DC power supply based on a current and a voltage from the DC power supply.

7. A torque control system according to claim 5, wherein said means for producing a control signal includes a calculating means for calculating a target electric power based on the rotational speed detected by said detecting means and a command torque value indicative of a torque to be produced by the AC motor.

8. A torque control system according to claim 7, wherein said calculating means comprises a map composed of values of DC electric power supply as a function of the values of rotational speeds of the AC motor and command torque values, and means for determining a target electric power from said map based on the detected rotational speed and the command torque value.

9. A torque control system according to claim 5, wherein said means for producing a control signal includes means for pulse width-modulating said control signal into a command amplitude value to control the inverter.

10. A torque control system according to claim 5, wherein said means for producing a control signal includes first calculating means for calculating an input electric power supplied from the DC power supply based on a current and a voltage from the DC power supply; and second calculating means for calculating a target electric power based on the rotational speed detected by said detecting means and a command torque value indicative of a torque to be produced by the AC motor.

11. A torque control system according to claim 10, wherein said means for producing a control signal includes a control means for producing a control signal from the difference between the input electric power and the target electric power.

12. A torque control system according to claim 10, wherein said second calculating means comprises a map composed of the values of electric power as a function of the values of rotational speeds of the AC motor and command torque values, and means for determining a target electric power from said map based on the detected rotational speed and the command torque value.

13. A torque control system according to claim 11, wherein said control means comprises means for effecting a proportional plus integral control process on the input electric power and the target electric power to produce said control signal.

14. A torque control system according to claim 10, wherein said means for producing a control signal includes means for pulse width-modulating said control signal into a command amplitude value to control said inverter.

15. A torque control system according to claim 5, wherein said means for producing a control signal includes first calculating means for calculating an input electric power supplied from the DC power supply based on a current and a voltage from the DC power supply;

second calculating means for calculating a target electric power based on the rotational speed detected by said detecting means and a command torque value indicative of a torque to be produced by the AC motor;

first control means for producing said control signal from the difference between the input electric power and the target electric power; and second control means for controlling a command amplitude value based on said control signal for controlling the inverter.

* * * * *